(12) United States Patent
Krishnamurthi et al.

(10) Patent No.: US 8,510,792 B2
(45) Date of Patent: Aug. 13, 2013

(54) GATED NETWORK SERVICE

(75) Inventors: Ganesh Krishnamurthi, Danville, CA (US); Balachander Krishnamurthy, New York, NY (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 573 days.

(21) Appl. No.: 12/626,225

(22) Filed: Nov. 25, 2009

(65) Prior Publication Data

US 2011/0126259 A1 May 26, 2011

(51) Int. Cl.
*G06F 21/00* (2006.01)

(52) U.S. Cl.
USPC ...... 726/1; 726/5; 726/11; 713/153; 713/165; 380/239; 709/224; 705/57

(58) Field of Classification Search
USPC .......................................... 726/1, 11; 709/224
See application file for complete search history.

(56) References Cited

U.S. PATENT DOCUMENTS

| | | | |
|---|---|---|---|
| 6,208,640 B1 * | 3/2001 | Spell et al. ..................... | 370/358 |
| 7,299,296 B1 * | 11/2007 | Lo et al. ......................... | 709/238 |
| 7,523,301 B2 * | 4/2009 | Nisbet et al. ................... | 713/153 |
| 7,725,399 B2 * | 5/2010 | Nakahara et al. ............... | 705/57 |
| 2001/0036192 A1 * | 11/2001 | Chiles et al. ................. | 370/401 |
| 2005/0240468 A1 * | 10/2005 | Inman et al. .................... | 705/10 |
| 2006/0136985 A1 * | 6/2006 | Ashley et al. ..................... | 726/1 |
| 2006/0143688 A1 | 6/2006 | Futoransky et al. | |
| 2007/0150951 A1 * | 6/2007 | Aaron et al. ..................... | 726/22 |
| 2007/0162748 A1 * | 7/2007 | Okayama et al. ............. | 713/165 |
| 2007/0199060 A1 * | 8/2007 | Touboul .......................... | 726/11 |
| 2008/0005778 A1 * | 1/2008 | Chen et al. ........................ | 726/1 |
| 2008/0148346 A1 * | 6/2008 | Gill et al. .......................... | 726/1 |
| 2010/0250733 A1 * | 9/2010 | Turanyi et al. ................ | 709/224 |

* cited by examiner

*Primary Examiner* — Morshed Mehedi
(74) *Attorney, Agent, or Firm* — Toler Law Group, PC

(57) ABSTRACT

A method includes identifying at a gateway device of a network a plurality of devices connected to the network. The method includes monitoring network traffic at the gateway device and determining that a particular traffic flow associated with one of the plurality of devices violates a privacy constraint. The method also includes providing a risk assessment associated with the privacy constraint violation. The risk assessment is at least partially based on terms and conditions associated with a particular device of the plurality of devices.

18 Claims, 6 Drawing Sheets

GATED NETWORK SERVICE

FIELD OF THE DISCLOSURE

The present disclosure is generally related to tracking information flow from local network devices.

BACKGROUND

Consumers have available to them a wide variety of devices that may be purchased and activated, such as set-top boxes, personal computers, and voice-over-internet protocol (VOIP) analog telephone adapters (ATAs), for example. These devices may communicate with a broadband network such as the Internet, for example. As part of the registration and activation of a purchased device or the registration and activation of a service to be performed by a device, a consumer may agree to a set of Terms and Conditions (T&C) from the manufacturer of the device or the service provider. Typically, the consumer may not reject portions of a T&C agreement and opting out of a T&C agreement will prevent a device from operating. The devices may be operable to autonomously collect and send data (over a connected broadband network) to a vendor or to a third party. One approach to tracking and restricting the types of data that a particular device sends over a broadband network is to install a firewall on the particular device.

DETAILED DESCRIPTION

Systems and methods for tracking information flowing from local network devices are disclosed. In a first particular embodiment, a method includes identifying at a gateway device of a network a plurality of devices connected to the network. The method includes monitoring network traffic at the gateway device and determining that a particular traffic flow associated with one of the plurality of devices violates a privacy constraint. The method also includes providing a risk assessment associated with the privacy constraint violation to a subscriber of a service associated with the gateway device. The risk assessment is at least partially based on terms and conditions associated with at least one device of the plurality of devices.

In a second particular embodiment, a network gateway device includes a network interface component configured to receive network traffic from a plurality of devices connected to a network. The network gateway device also includes a privacy module that is coupled to the network. The privacy module is configured to identify the plurality of devices connected to the network. The privacy module is also configured to monitor network traffic at the gateway device and to determine that a particular traffic flow associated with one of the plurality of devices violates a privacy constraint. The privacy module is also configured to provide a risk assessment associated with the privacy constraint violation to a subscriber of a service associated with the gateway device. The risk assessment is at least partially based on a terms-and-conditions document associated with at least one device of the plurality of devices.

In a third particular embodiment, a computer-readable storage medium includes instructions, that when executed by a processor, cause the processor to receive information at a service provider system from a gateway device of a network. The information includes traffic flow information associated with a plurality of devices connected to the network. The computer-readable storage medium also includes instructions, that when executed by the processor, cause the processor to develop rules used in determining whether traffic flow at the gateway device violates a privacy constraint. The rules are based at least partially on the received information. The computer-readable storage medium further includes instructions, that when executed by the processor, cause the processor to send the rules to the gateway device.

Figure 1:
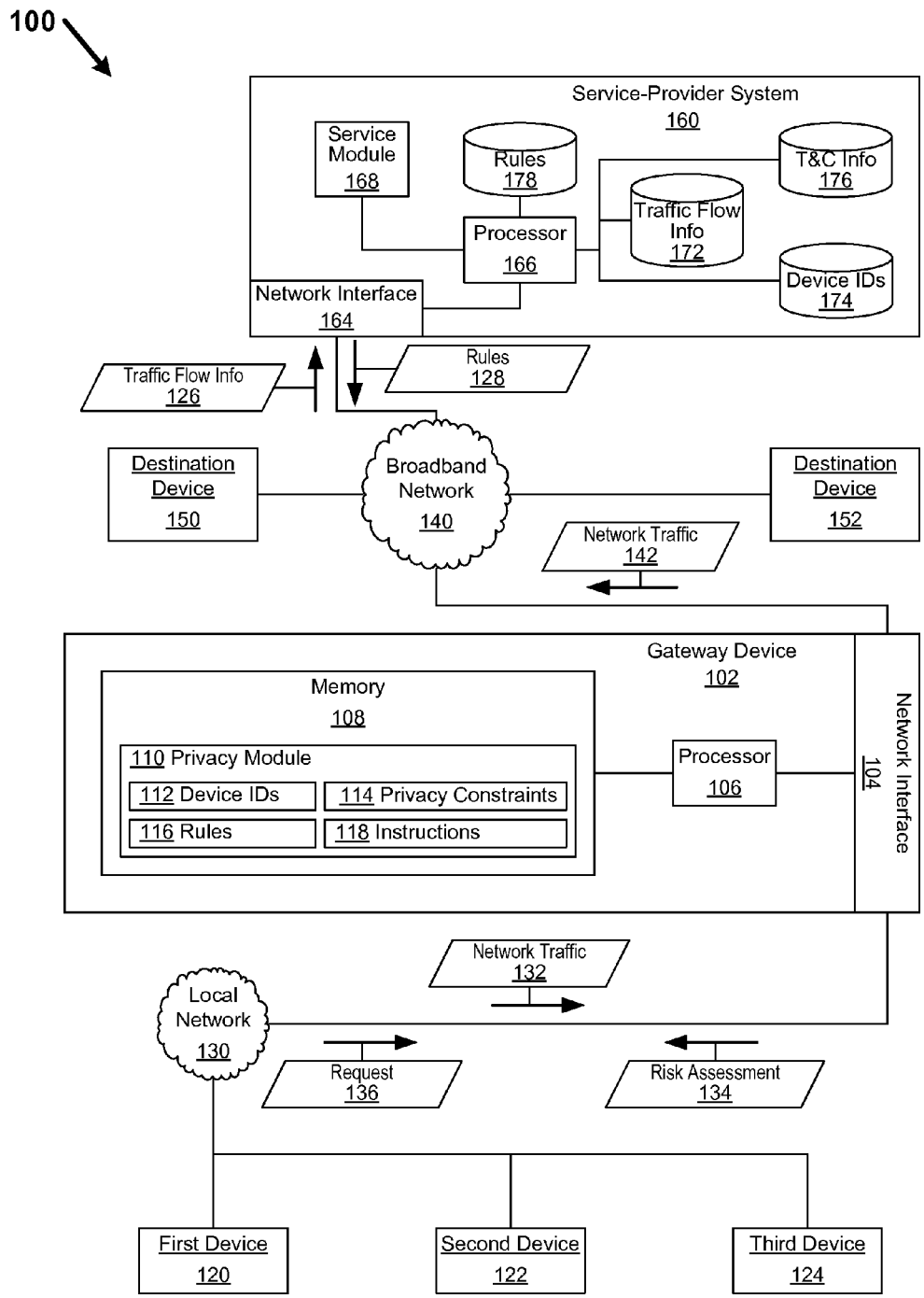
FIG. 1 is a block diagram of a particular embodiment of a system to track information flowing from local network devices.

FIG. 1 depicts a particular embodiment of a system 100 to track information flowing from a plurality of devices 120, 122, 124 connected to a local network 130. The system 100 includes a gateway device 102 connected to the local network 130. The gateway device 102 enables the network devices 120, 122, 124 connected to the local network 130 to communicate via a broadband network 140. Examples of a gateway device 102 include a modem and a router. Additionally, the gateway device 102 may be implemented using deep packet inspection at a Deep Packet Inspector (DPI) blade on a network transport path between the devices 120-124 and the service provider system 160. For example, the gateway device 102 may comprise a modem connected to the broadband network 140 (e.g., the internet) and the network devices 120, 122, 124 may be connected to a router, which is connected to the gateway device 102. Alternately, the gateway device 102 may comprise a router and the network devices 120, 122, 124 may be connected directly to the router. The plurality of devices 120, 122, 124 may include one or more of a gaming console, a set-top box, a digital-video-disk (DVD) player, a blu-ray player, a television, a wireless security device, a utility measurement device, a health care monitoring device, and a voice-over-internet protocol (VOIP) analog telephone adapter (ATA).

The gateway device 102 includes a network interface 104, a processor 106, and memory 108. The network interface 104 is configured to receive network traffic 132 from each of the plurality of devices 120, 122, 124 connected to the local network 130. The network interface 104 is also configured to communicate network traffic 142 to the broadband network 140. The gateway device 102 also includes the processor 106 connected to the network interface 104 and the memory 108 connected to the processor 106.

The memory 108 includes a privacy module 110. The privacy module 110 includes device identifiers (IDs) 112, privacy constraints 114, rules 116, and computer-executable instructions 118. The device IDs 112 include information identifying each of the plurality of devices 120, 122, 124 connected to the local network 130. The privacy constraints 114 include information associated with restrictions of what types of information can be removed from the network traffic 132 generated by the plurality of devices 120, 122, 124. The privacy constraints also include information associated with identifying destination devices 150, 152 that may be determined to be inappropriate destinations for the network traffic 132 generated by the plurality of devices 120, 122, 124 connected to the local network 130. The privacy module 110 also includes rules that may be applied by the gateway device 102 to the network traffic 132 to provide a risk assessment 134 to one or more of the devices 120, 122, 124 connected to the local network 130. The privacy module 110 further includes computer-executable instructions 118 that, when executed by the processor 106, cause the processor 106 to perform methods described herein.

The system 100 also includes destination devices 150, 152 and a service-provider system 160 connected to the broadband network 140. The destination devices 150, 152 may be any device connected to the broadband network 140 that is an intended destination of the network traffic 132 generated by one or more of the devices 120, 122, 124 connected to the local network 130.

The service-provider system 160 includes a network interface 164 connected to the broadband network 140 and a processor 166 connected to the network interface 164. The service-provider system 160 further includes a service module 168, traffic flow information 172, device IDs 174, terms-and-conditions information 176, and rules 178. The service module 168 is configured to performed methods described herein. The traffic flow information 172 includes information associated with the network traffic 132 generated by the devices 120, 122, 124 connected to the local network 130. The traffic flow information 172 also includes information associated with the network traffic 142 sent to the broadband network 140 by the gateway device 102. The device IDs 174 includes information identifying the plurality of devices 120, 122, 124 connected to the local network 130. The T&C information 176 includes terms and conditions associated with devices whose identities are included in the device IDs 174. The rules 178 include rules usable to determine whether traffic flow at the gateway device 102 violates a privacy constraint. The rules 178 are based at least partially on traffic flow information 126 received at the service-provider system 160.

In operation, the gateway device 102 may identify the plurality of devices 120, 122, 124 connected to the local network 130. The gateway device 102 may store the identities of the devices 120, 122, 124 in the device IDs 112 at the gateway device 102. The gateway device 102 may also monitor the network traffic 132 at the gateway device 102.

The gateway device 102 may determine that a particular traffic flow associated with one of the plurality of devices violates a privacy constraint. The violated privacy constraint may be one of a plurality of privacy constraints included in the privacy constraints 114 at the privacy module 110. The violated privacy constraint may be at least partially based on a type of information included in the particular traffic flow. The type of information may include personal information associated with one or more users of the devices 120, 122, 124 connected to the local network 130. In particular embodiments, the type of information includes one or more of a user name, a user address, account information, device usage statistics, an internet protocol (IP) address, and biometric information. For example, the gateway device 102 may determine that the traffic flow 132 contains a particular user name and a particular user address of a user of the first device 120. When applying one or more rules 116 to the network traffic 132, the gateway device 102 may determine that the presence of the user name and the user address violates a constraint that personal information associated with the particular user should not be sent over the broadband network 140.

In particular embodiments, the particular traffic flow originates from a first device (e.g., first device 120) of the plurality of devices 120, 122, 124 and the type of information is associated with a second device (e.g., the second device 122 or the third device 124) of the plurality of devices 120, 122, 124. For example, the first device 120 may obtain information (e.g., a serial number or usage statistics) from the second device 122 by communicating with the second device 122 via the local network 130. The first device 120 may include the information in the network traffic 132 and attempt to communicate the information over the broadband network 140. The gateway device 102 may apply one or more rules 116 and determine that the type of the information or the destination of the information violates one or more privacy constraints 114.

The violated privacy constraint may be at least partially based on a particular destination device of traffic flow monitored at the gateway device 102. For example, the first device 120 may be sending the network traffic 132 to the destination device 150. The destination device 150 may have previously been determined to be an untrustworthy device. The gateway device 102 may apply one or more of the rules 116 in determining that the network traffic violates a constraint that information should not be sent to an untrustworthy device. The violated privacy constraint may be at least partially based on a particular source device of traffic flow monitored at the gateway device 102. For example, the second device 122 may be a device (e.g., a game console) that is typically used by minor children in a household. The gateway device 102 may apply one or more of the rules 116 in determining that the network traffic violates a constraint that information should not be sent to the broadband network 140 from the second device 122. In particular embodiments, determining that the particular traffic flow violates a privacy constraint is at least partially based on at least one of a trust level of a source of the particular traffic flow and a trust level of a destination of the particular traffic flow. In particular embodiments, the gateway device 102 determines that the particular traffic flow violates a privacy constraint by determining a source of the particular traffic flow, determining a destination of the particular traffic flow, and determining a type of information included in the particular flow.

The gateway device 102 may provide a risk assessment 134 associated with a privacy constraint violation to a subscriber of a service associated with the gateway device 102. In particular embodiments, the risk assessment 134 is at least partially based on terms and conditions associated with a particular device of the plurality of devices 120, 122, 124 connected to the local network 130. For example, an owner of the gateway device 102 may subscribe to a service provided by the service-provider system 160. Upon subscribing to the service, the subscriber may provide identifications for each of the plurality of devices 120, 122, 124. The subscriber may provide terms and conditions agreed to by the subscriber and a manufacturer of the device associated with the terms and conditions. Alternately, the subscriber may provide terms and conditions agreed to by the subscriber and a service associated with the device. In particular embodiments, the service-provider system 160 stores device identifications in the device IDs 174 and stores the terms and conditions in the T&C information 176.

In particular embodiments, the terms and conditions associated with a particular device may indicate that the manufacturer of the device will not gather particular types of information from the device. However, an owner of the device may not wish to rely on the manufacturer to enforce those terms and conditions. The gateway device 102 may be configured as described herein to determine whether a traffic flow including the particular information may violate one or more privacy constraints 114.

In particular embodiments, the risk assessment 134 includes a recommendation of removing particular information from a particular traffic flow. For example, if the gateway device 102 determines that the presence of the particular information in the particular traffic flow violates a privacy constraint, the gateway device 102 may provide a risk assessment 134 to a subscriber of the gateway device 102. The risk assessment 134 may be sent to a particular device of the plurality of devices 120, 122, 124 and may include a recommendation of removing the particular information from a particular traffic flow.

The subscriber may interact with the particular device receiving the recommendation and cause the particular device to respond to the risk assessment 134 including the recommendation by sending a request 136 to the gateway device 102. For example, the subscriber may interact with a user interface on the first device 120 and display the recommendation on a display screen of the first device 120. The user may enter an indication as to whether the subscriber wishes to accept the recommendation or not. The user may indicate an acceptance of the recommendation and the first device 120 may respond by sending to the gateway device 102 a request 136 to remove the particular information from the particular traffic flow. The gateway device 102 may receive the request 136 from the responding device 120. The gateway device 102 may then remove the particular information from the particular traffic flow. Alternately, the user may indicate a rejection of the recommendation and the first device 120 may respond by sending to the gateway device 102 a request 136 to not remove the particular information from the particular traffic flow. The user interface may also be used to configure one or more privacy parameters (e.g., name, address, social security number (SSN)) with wildcards to block or flag particular strings. For example, as described below, a false positive may result when a string contains a name or SSN that may not necessarily be leakage. The user interface may allow a user to provide further information with respect to contextual filtering. In one embodiment, the user interface provides common false positives that are available for user configuration. The gateway device 102 may then send the network traffic 132 to the broadband network 140 without removing the particular information.

In particular embodiments, the service-provider system 160 updates the rules 116 at the gateway device 102. For example, the gateway device 102 may send information 126 associated with a particular traffic flow to the service-provider system 160. The service-provider system 160 may store the traffic flow information 172 in a database, for example. The service module 168 of the service-provider system 160 may use the stored traffic flow information 172 to develop rules for determining whether traffic flow at the gateway device 102 violates one or more privacy constraints. In particular embodiments, the service-provider system 160 maintains a database including identities 174 of each of the plurality of devices 120, 122, 124 connected to the local network 130, information from T&C agreements 176 associated with each of the plurality of devices 120, 122, 124, as well as the traffic flow information 172. In particular embodiments, the service module 168 develops rules 178 based on at least one statistical model. A user may request the rules 116, or the rules 116 may be updated automatically. For example, the rules 116 may be retrieved from the service-provider system 160 periodically (e.g., a scheduled update). As another example, the service-provider system 160 may send an alert that indicates that updated rules 116 are available.

Rules developed by the service-provider system 160 may be related to a source of traffic flow, a destination of traffic flow, particular information in traffic flow, or any combination of these. In particular embodiments, a rule may determine that a particular source device should not communicate with certain destination devices. For example, the rule may determine that the source device 120 should not communicate with the destination device 150. An identifier for the destination device 150 may be placed in a destination blacklist. When the gateway device 102 detects traffic flow from the source device 120, the gateway device 102 may determine whether an identifier of the destination device 150 of the traffic flow is in the destination blacklist and, if so, may send the risk assessment 134 to a subscriber of the gateway device 102. The risk assessment 134 may include a recommendation to block the traffic flow from the source device 120 to the destination device 150. In particular embodiments, a subscriber may override the recommendation and allow the gateway device 102 to permit the source device 120 to communicate with the destination device 150.

In particular embodiments, blacklists such as the destination blacklist described above, are maintained at the gateway device 102. A blacklist may be updated by a user of the gateway device 102 via a user interface provided by the gateway device 102. Also, a blacklist may be updated by the service-provider system 160. For example, the blacklist may include names or SSNs. Pattern matching may be performed on the blacklist and may include removing false positives. For example, the string "Harry" may be legitimately present and should be sent even if the string happens to be the name of someone. Likewise, a string of digits may have an embedded SSN match in the string that results in a false positive. In this case, filtering may be done based on contextual matching (e.g., in the presence of "Name:" or "SSN:", among other possibilities).

In particular embodiments, a rule may determine that any source device should be allowed to communicate with particular destination devices. For example, the rule may determine that all of the source devices 120, 122, 124 should be allowed to communicate with the destination device 152. An identifier for the destination device 152 may be placed in a destination whitelist. When the gateway device 102 detects traffic flow intended for the destination device 152, the gateway device 102 may determine that the communication should be allowed.

In particular embodiments, whitelists such as the destination whitelist described above, are maintained at the gateway device 102. A whitelist may be updated by a user of the gateway device 102 via a user interface provided by the gateway device 102. Also, a whitelist may be updated by the service-provider system 160.

In particular embodiments, a rule may determine that communication of particular information from any source device should be blocked. For example, the rule may determine that communication of particular information such as user names and social security numbers over the broadband network 140 should be blocked. The particular information may be placed in an information blacklist. When the gateway device 102 detects traffic flow from a source device that includes the particular information, the gateway device 102 may send a risk assessment 134 to a subscriber of the gateway device 102. The risk assessment 134 may include a recommendation to remove the particular information.

In particular embodiments, a subscriber may override the recommendation and allow the gateway device 102 to permit the communication of the particular information. In particular embodiments, a user may anonymize the particular information. For example, a subscriber may override the recommendation and allow the gateway device 102 to permit the communication of the particular information but may provide a request to the gateway device 102 to block the source of the particular information. Also, the subscriber may request additional attributes of the particular information be blocked or request certain portions of the particular information be blocked and request that the remaining portions of the particular information be communicated. In this manner, a subscriber may "scrub" certain personally identifiable information from particular information to be communicated. User overrides of the recommendations may be useful in improving the system. As such, override information may be stored at the gateway 102 for transmission to the service-provider system 160 or may sent to the service-provider system 160 without being stored at the gateway 102.

In particular embodiments, the gateway device 102 receives the developed rules 178 from the service-provider system 160. The gateway device 102 may store the received rules 116 at the gateway device 102. In particular embodiments, the gateway device 102 applies the rules 116 to determine whether traffic flow associated with one of the plurality of devices 120, 122, 124 violates any privacy constraints.

Thus, the gateway device 102 may be used to enforce terms and conditions of one or more devices 120, 122, 124 connected to the local network. The gateway device 102 may help prevent information associated with a first device from being sent to the broadband network 140 even if a second device obtains the information from the first device and attempts to send the information to the broadband network 140. The gateway device 102 also monitors the network traffic 132 received from many different types of devices.

Figure 2:
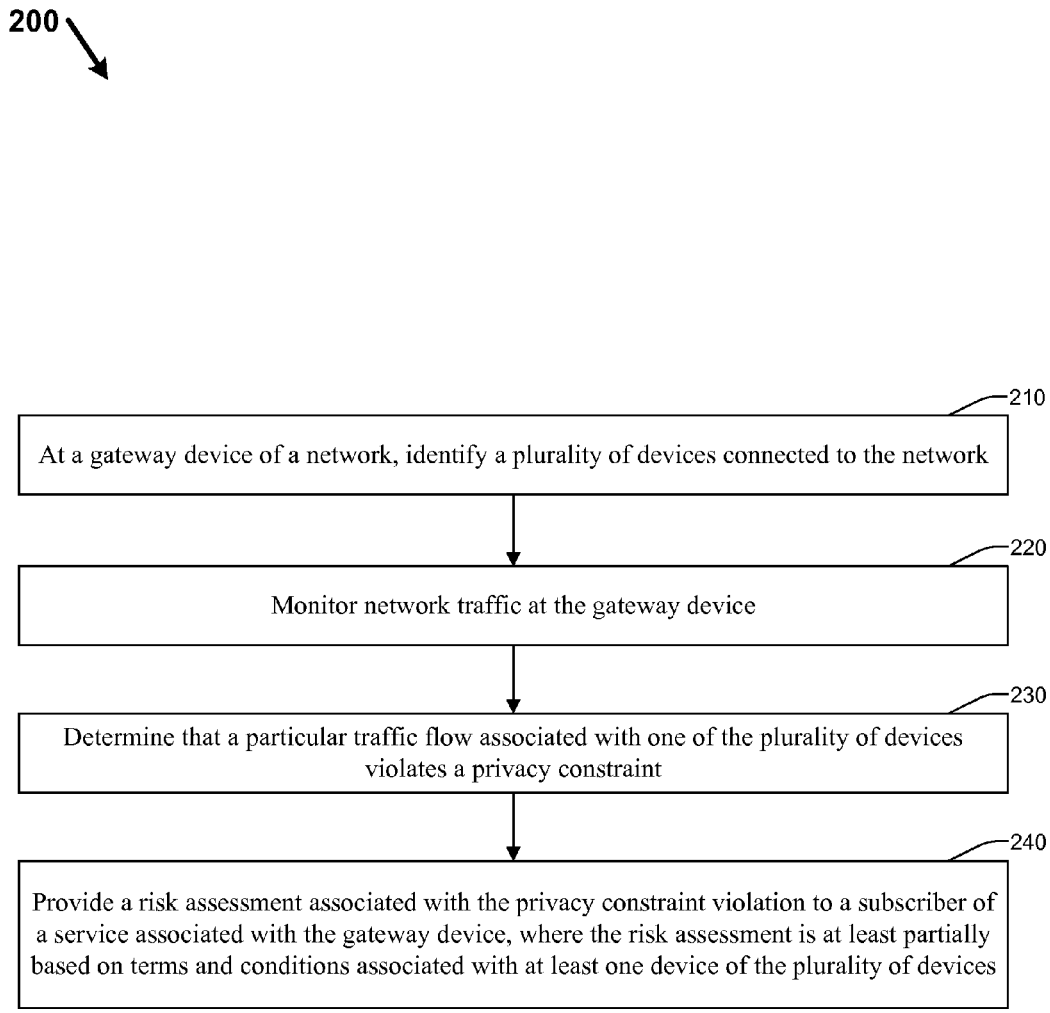
FIG. 2 is a flow diagram of a first particular embodiment of a method to track information flowing from local network devices.

Referring to FIG. 2, a flow diagram of a first particular embodiment 200 of a method usable to track information from local network devices is depicted. The method may be performed by a gateway device, such as the gateway device 102 of FIG. 1.

A gateway device of a network identifies a plurality of devices connected to the network, at 210. The gateway device may be the gateway device 102 of the local network 130 as depicted in FIG. 1. The plurality of devices connected to the network may be the plurality of devices 120, 122, 124 shown in FIG. 1. Advancing to 220, the gateway device monitors network traffic at the gateway device.

The gateway device determines that a particular traffic flow associated with one of the plurality of devices violates a privacy constraint, at 230. The privacy constraint may be one of the privacy constraints 114 depicted in FIG. 1. In particular embodiments, the gateway device applies rules to the particular traffic flow. The rules may be one or more of the rules 116 depicted in FIG. 1.

Advancing to 240, the gateway device provides a risk assessment associated with the privacy constraint violation to a subscriber of a service associated with the gateway device. The risk assessment is at least partially based on terms and conditions associated with at least one device of the plurality of devices. For example, the terms and conditions may indicate that particular information will not be collected by a particular network device. The gateway device may enforce the terms and conditions by placing the particular information in an information blacklist. When the gateway device determines that the particular information is in monitored traffic flow, the gateway device may send a risk assessment to a subscriber of the gateway device indicating the potential T&C violation.

Figure 3:
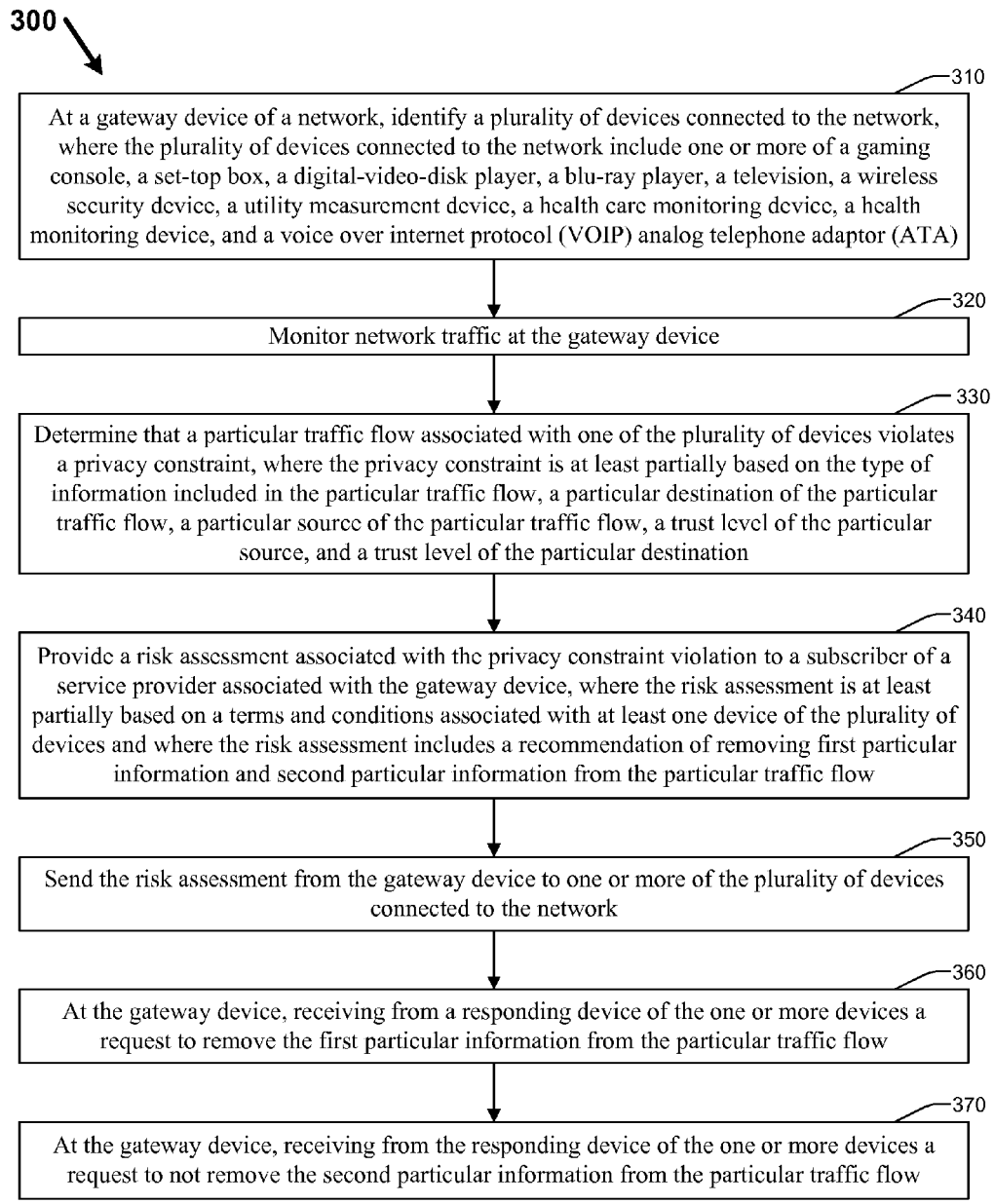
FIGS. 3 and 4 is a flow diagram of a second particular embodiment of a method to track information flowing from local network devices.
Figure 4:
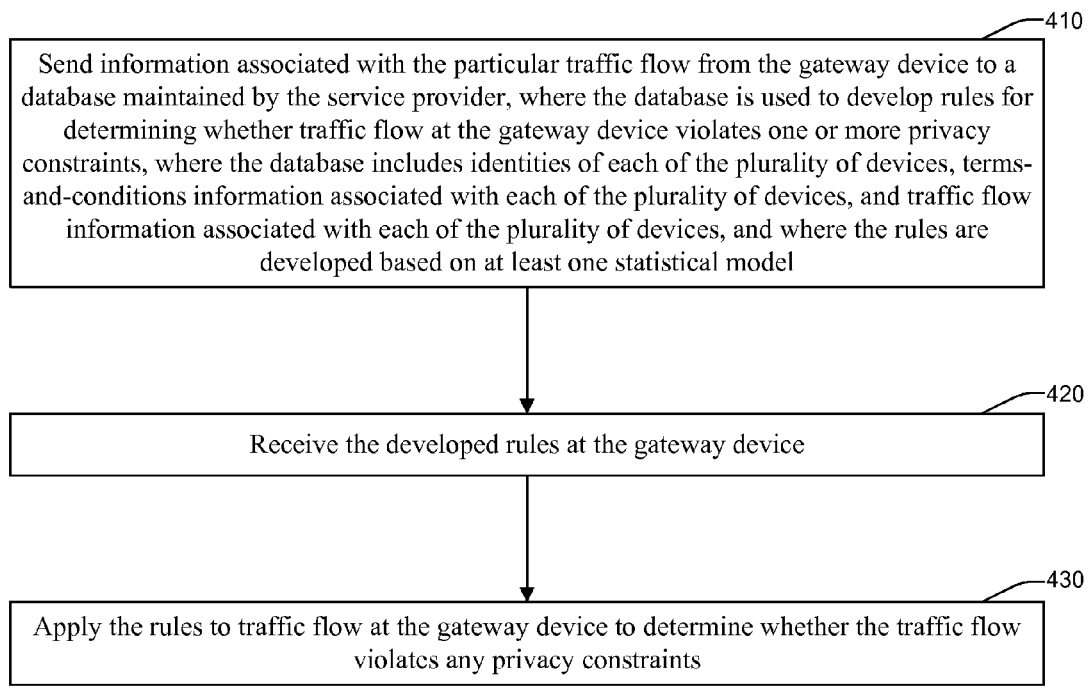

Referring to FIG. 3 and FIG. 4, a flow diagram of a second particular embodiment 300 of a method usable to track information flowing from local network devices is depicted. The method may be performed by a gateway device, such as the gateway device 102 of FIG. 1.

A gateway device of a network identifies a plurality of devices connected to the network, at 310. The gateway device may be the gateway device 102 of the local network 130 as depicted in FIG. 1. The plurality of devices connected to the network may be the plurality of devices 120, 122, 124 shown in FIG. 1. The plurality of devices connected to the network include one or more of a gaming console, a set-top box, a digital-video-disk player, a blu-ray player, a television, a wireless security device, a utility measurement device, a health care monitoring device, a health monitoring device, and a voice over internet protocol (VOIP) analog telephone adaptor (ATA). A wireless security device may, for example, communicate video taken from a security camera over a broadband network to a security service. In particular embodiments, the gateway device 102 may restrict the wireless security device from communicating personal information or any information other than video from the security camera. A utility measurement device may communicate utility usage data (e.g., amount of electricity and water used) over a broadband network to a utility company that can use the data to prepare an invoice. In particular embodiments, the gateway device 102 may restrict the utility measurement device from communicating personal information or any information other than the utility usage data.

Advancing to 320, the gateway device monitors network traffic at the gateway device.

The gateway device determines that a particular traffic flow associated with one of the plurality of devices violates a privacy constraint, at 330. The privacy constraint may be one of the privacy constraints 114 depicted in FIG. 1. In particular embodiments, the gateway device applies rules to the particular traffic flow to determine the privacy constraint violation. The rules may be one or more of the rules 116 depicted in FIG. 1. The privacy constraint is at least partially based on the type of information included in the particular traffic flow, a particular destination of the particular traffic flow, a particular source of the particular traffic flow, a trust level of the particular source, and a trust level of the particular destination.

In one illustrative scenario, the particular source of the traffic flow is a first device of the plurality of devices, and the type of information is associated with a second device of the plurality of devices. For example, the source of the traffic flow may be a first device that has obtained information from the second device via the network. The first device may then attempt to send the obtained information over a broadband network. The gateway device may then determine that sending the obtained information over the broadband network is a violation of a privacy constraint.

Advancing to 340, the gateway device provides a risk assessment associated with the privacy constraint violation to a subscriber of a service provider associated with the gateway device. The risk assessment is at least partially based on terms and conditions associated with at least one device of the plurality of devices. The risk assessment includes a recommendation of removing first particular information and second particular information from the particular traffic flow. The gateway device sends the risk assessment to one or more devices of the plurality of devices connected to the network.

The subscriber may select whether the first particular information is to be removed from the particular traffic flow and may select whether the second particular information is to be removed from the traffic flow. The gateway device receives from a responding device of the one or more devices a request to remove the first particular information from the particular traffic flow, at 360. Advancing to 370, the gateway device receives from the responding device a request to not remove the second particular information from the particular traffic flow.

The gateway device sends information associated with the particular traffic flow to a database maintained by the service provider, at 410. The information associated with the particular traffic flow may be the traffic flow information 126 depicted in FIG. 1. In particular embodiments, the database is maintained by the service-provider system 160 depicted in FIG. 1. The database is used to develop rules for determining whether traffic flow at the gateway device violates one or more privacy constraints. The rules may be developed based on at least one statistical model. The developed rules may be the rules 178 depicted in FIG. 1 and the rules may be developed by the service-provider system 160 depicted in FIG. 1. The database includes identities of each of the plurality of devices, terms-and-conditions information associated with each of the plurality of devices, and traffic flow information associated with each of the plurality of devices. The identities of the plurality of devices may be the device IDs 174 depicted in FIG. 1. The terms-and-conditions information may be the T&C information 176 depicted in FIG. 1. The traffic flow information associated with each of the plurality of device may be the traffic flow information 172 depicted in FIG. 1.

Advancing to 420, the gateway device receives the developed rules. The gateway device 102 may add the received rules to the rules 116 depicted in FIG. 1. Also, the gateway device 102 may replace one or more of the rules 116 depicted in FIG. 1 with the received rules. The gateway device applies the rules to traffic flow at the gateway device to determine whether the traffic flow violates any privacy constraints.

The method depicted in FIG. 3 and FIG. 4 may provide a "gatekeeping service" usable to protect a local network by restricting information from flowing from the local network to a broadband network. In accordance with the service, a gateway device may identify devices connected to the local network and may monitor network traffic at the gateway device. The devices connected to the local network may comprise many different types of devices, including non-traditional computing devices. The gateway device can detect when network traffic includes information that should not be leaked to a broadband network. The gateway device may remove the information or allow a user to override a recommendation from the gateway device and allow the information to be sent to the broadband network.

The gatekeeping service may be activated at a residential router, a residential modem, a DPI, or a hub, for example. The service may have a logging capability and a reference of one or more whitelists for generally allowable information, source devices, and destination devices and a reference of one or more blacklists for generally non-allowable information, source devices, and destination devices. The logging capability may include logging user settings, recommendations, alerts, or warnings, among other alternatives. Further, the logging capability may include default settings and may be user configurable. For example, user configuration may allow the user to choose a balance between interrupt driven recommendations and silent logging.

The gatekeeping service may offer improved protection over other approaches and methods. For example, firewalls are designed to prevent certain intrusions from an external environment. Firewalls may include software resident locally on computers, or are built for specific types of protection. Software for protecting against viruses, malware, worms, phishing, etc. may not be designed for non-traditional computing devices. Accordingly, devices other than computers that can communicate via a broadband network may be unprotected. For example, a digital-video-disc (DVD) player may not have a firewall or virus protection software available for the DVD player. The gatekeeping service may monitor network traffic communicated from the DVD player and may block particular information that is inappropriate for communicating over a broadband network. The gatekeeping service may also determine that the DVD player may be infected by a virus or other malware and may send a risk assessment to a subscriber to notify the subscriber of the potential infection. Additionally, other solutions do not correlate a device's activity, destination of network traffic, and terms and conditions of a device to assess risk of information leakage in the manner that the gatekeeping service may do so.

Figure 5:
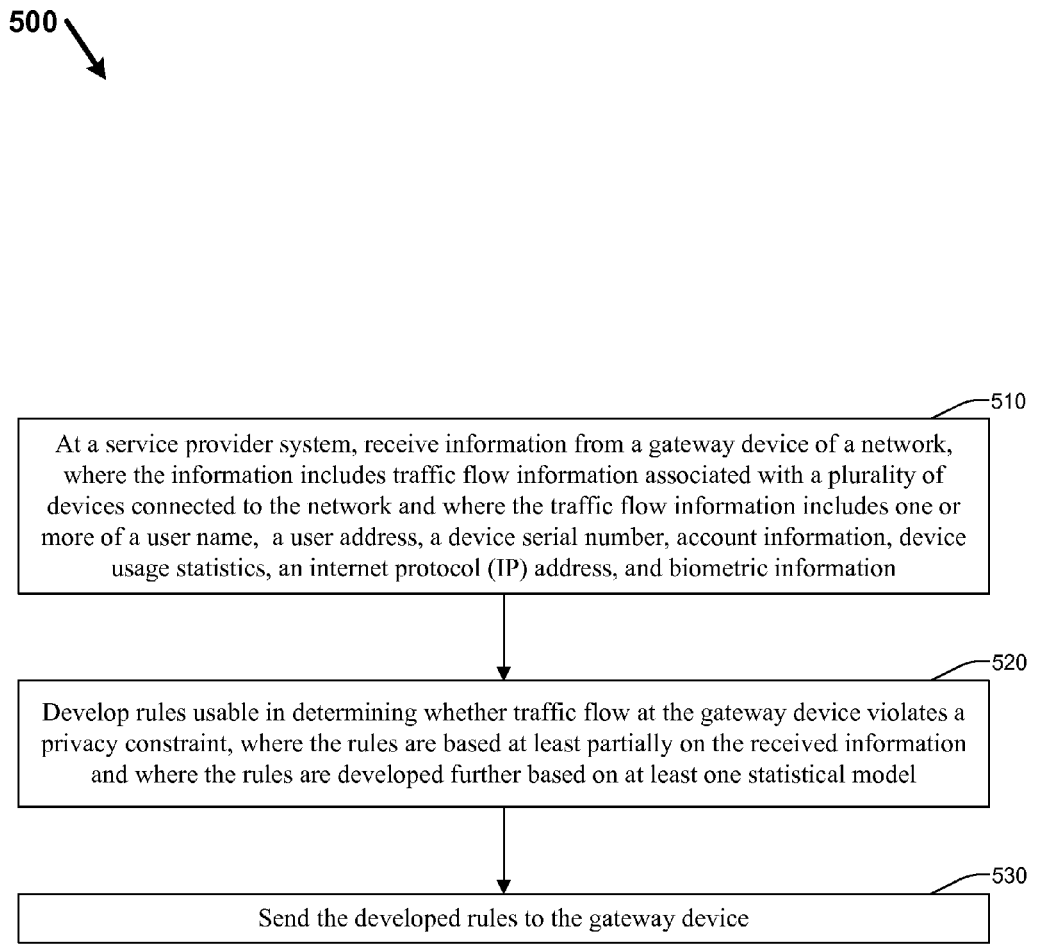
FIG. 5 is a flow diagram of a third particular embodiment of a method to track information flowing from local network devices.

Referring to FIG. 5, a flow diagram of a third particular embodiment 500 of a method usable to track information flowing from local network devices is depicted. The method may be performed by a service-provider system. For example, the method may be performed by the server-provider system 160 depicted in FIG. 1.

The service-provider system receives information from a gateway device of a network, at 510. The gateway device may be the gateway device 102 depicted in FIG. 1. The information includes traffic flow information associated with a plurality of devices connected to the network. The traffic flow information includes one or more of a user name, a user address, a device serial number, account information, device usage statistics, an internet protocol (IP) address, and biometric information. The traffic flow information may be the traffic flow information depicted in FIG. 1.

Advancing to 520, the service-provider system develops rules for use in determining whether traffic flow at the gateway device violates a privacy constraint. The rules are based at least partially on the received information. The developed rules may be the rules 178 depicted in FIG. 1. The service-provider system sends the developed rules to the gateway device, at 530.

The method depicted in FIG. 5 may allow a service provider to receive traffic flow information associated with a local network. The service provide may use the received traffic flow information to develop rules usable in determining whether traffic flow at a gateway device violates a privacy agreement. Thus, the service provider can continuously update the rules to provide a self-adapting or self-learning gatekeeping service at the gateway device. The service provider may insure the gatekeeping service and provide a risk assurance policy to the subscriber.

Figure 6:
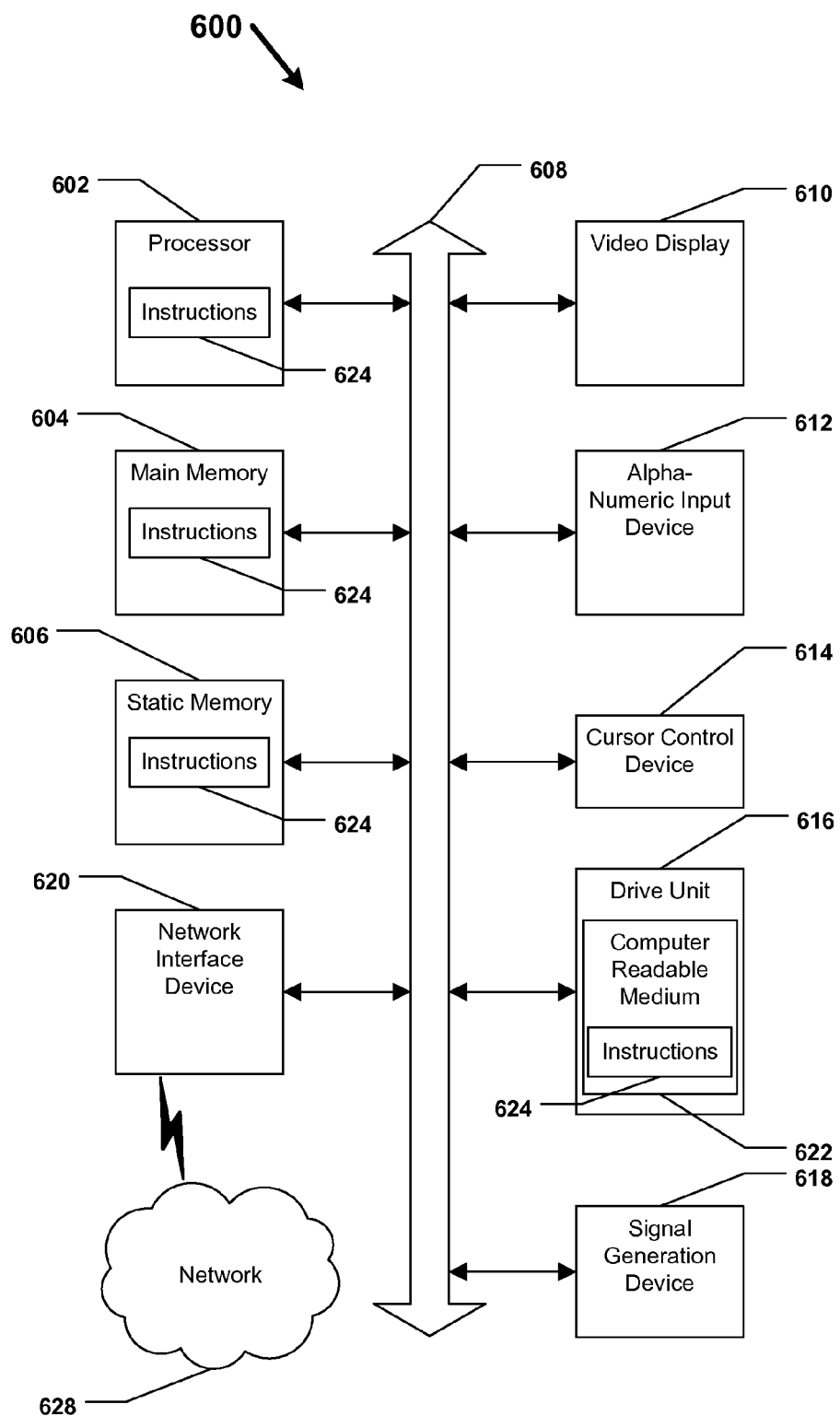
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices. For example, the computer system 600 may include or be included within either or both of the gateway device 102 depicted in FIG. 1 and the service-provider system 160 depicted in FIG. 1.

In a networked deployment, the computer system 600 may operate in the capacity of a gateway device or a service-provider device, as described above with reference to FIGS. 1-5. The computer system 600 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or subsystems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate via a bus 608. As shown, the computer system 600 may further include a video display unit 610, such as a liquid crystal display (LCD), an organic light emitting diode (OLED), a flat panel display, or a solid-state display. Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable storage medium that includes instructions 624 to enable a device connected to a network 628 to communicate voice, video or data over the network 628. Further, the instructions 624 may be transmitted or received over the network 628 via the network interface device 620.

While the computer-readable storage medium is shown to be a single medium, the term "computer-readable storage medium" includes a single medium or multiple media, such as a centralized or distributed database, and/or associated caches and servers that store one or more sets of instructions. The term "computer-readable storage medium" shall also include any tangible storage medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, VoIP, IPTV, MPEG, SMPTE, ATM, IEEE 802.11, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
    monitoring network traffic at a gateway device of a network, wherein the network traffic is received from a plurality of devices connected to the network;
    sending traffic flow information associated with the plurality of devices to a service provider system, wherein the traffic flow information includes an internet protocol address;
    identifying a privacy constraint violation by determining that a particular traffic flow of the network traffic violates a privacy constraint at least partially based on a destination of the particular traffic flow, wherein the particular traffic flow is associated with a first device of the plurality devices;
    sending, to a second device of the plurality of devices, information associated with the privacy constraint violation, wherein the information is at least partially based on one or more rules associated with the second device of the plurality of devices, and wherein the one or more rules are automatically changed based on one or more network traffic statistics, the one or more network traffic statistics determined based on network traffic monitored at the gateway device after the gateway device receives the one or more rules; and
    receiving a request from the second device to perform an action on the particular traffic flow, wherein the action is based on the information associated with the privacy constraint violation.

2. The method of claim 1, wherein the information indicates a recommendation to perform the action on the particular traffic flow.

3. The method of claim 1, wherein the action indicates an instruction to not remove particular information from the particular traffic flow.

4. The method of claim 3, wherein the request is received in response to sending the information, and wherein the information indicates a recommendation to remove the particular information from the particular traffic flow.

5. The method of claim 1, wherein the privacy constraint is at least partially based on a type of particular information included in the particular traffic flow.

6. The method of claim 5, wherein the type of particular information includes a name, an address, a social security number, or a combination thereof.

7. The method of claim 1, wherein the destination is at least partially based on device information associated with the first device.

8. The method of claim 7, wherein the device information includes a device serial number, device usage statistics, or both.

9. The method of claim 1, wherein the one or more rules are used to determine whether the particular traffic flow violates the privacy constraint.

10. The method of claim 1, wherein the one or more rules are developed based on a model of traffic flow statistics associated with at least one of the plurality of devices.

11. The method of claim 1, further comprising receiving the one or more rules at the gateway device.

12. The method of claim 1, wherein the privacy constraint violation is based on particular information included in the particular traffic flow, and wherein the action indicates an instruction to remove the particular information from the traffic flow.

13. The method of claim 1, wherein determining that the particular traffic flow violates the privacy constraint is at least partially based on a trust level of a source of the particular traffic flow, a trust level of the destination of the particular traffic flow, or both.

14. The method of claim 1, wherein the plurality of devices connected to the network includes a gaming device, a set-top box device, a media device, a television, or a combination thereof.

15. A gateway device comprising:
    a processor; and
    a memory accessible to the processor, the memory including instructions that are executable by the processor to perform operations comprising:
    monitoring network traffic received from a plurality of devices connected to a network;
    sending traffic flow information associated with the plurality of devices to a service provider system, wherein the traffic flow information includes an internet protocol address;
    identifying a privacy constraint violation by determining that a particular traffic flow of the network traffic violates a privacy constraint at least partially based on a destination of the particular traffic flow, wherein the particular traffic flow is associated with a first device of the plurality devices;
    sending, to a second device of the plurality of devices, information associated with the privacy constraint violation, wherein the information is at least partially based on one or more rules associated with the second device of the plurality of devices, and wherein the one or more rules are automatically changed based on one or more network traffic statistics, the one or more network traffic statistics determined based on network traffic monitored at the gateway device after the gateway device receives the one or more rules; and receiving a request from the second device to perform an action on the particular traffic flow, wherein the action is based on the information associated with the privacy constraint violation.

16. The gateway device of claim 15, wherein the plurality of devices connected to the network includes a wireless security device, a utility measurement device, a health care monitoring device, or a combination thereof.

17. The gateway device of claim 15, wherein the plurality of devices connected to the network includes a voice over internet protocol adapter.

18. A computer-readable storage device comprising instructions that, when executed by a processor, cause the processor to perform operations comprising:
- at a service provider system, receiving information from a gateway device, wherein the information includes traffic flow information associated with a plurality of devices connected to a network, wherein the traffic flow information includes an internet protocol address;
- developing, by the service provider system, rules usable in determining whether traffic flow in network traffic monitored at the gateway device violates a privacy constraint, wherein the rules are developed based at least partially on the information received from the gateway device and at least partially on a destination of the traffic flow;
- sending the rules to the gateway device; and
- automatically changing the rules based on one or more network traffic statistics, the one or more network traffic statistics determined based on the network traffic monitored at the gateway device after the rules have been sent to the gateway device.

* * * * *